Figure 1:
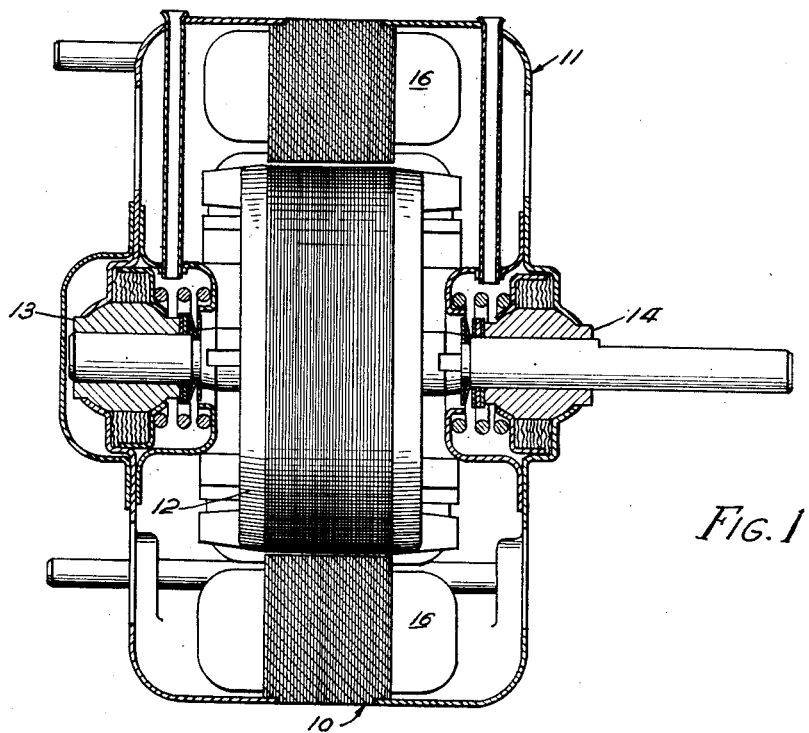

Oct. 6, 1959

K. L. CARPENTER 2,907,904

CAPACITOR RUN MOTORS

Filed March 16, 1956

2 Sheets-Sheet 1

Oct. 6, 1959   K. L. CARPENTER   2,907,904
CAPACITOR RUN MOTORS
Filed March 16, 1956   2 Sheets-Sheet 2

United States Patent Office 2,907,904
Patented Oct. 6, 1959

2,907,904

CAPACITOR RUN MOTORS

Kenneth L. Carpenter, Uxbridge, England, assignor to The Hoover Company, North Canton, Ohio, a corporation of Ohio Application March 16, 1956, Serial No. 572,163

4 Claims. (Cl. 310—166)

The present invention relates to motors and more particularly to motors of the capacitor start and capacitor run type.

Prior motors of the capacitor start, capacitor run type have both the main winding and the dephased capacitor winding in the form of distributed windings wound in inwardly extending slots about the periphery of the stator field stack. In such constructions the turns of the dephased winding overlap those of the main windings to some extent and it is necessary that turns of both coils occupy the same slots.

In machine winding such motors, a very complicated winding machine is necessary resulting in a time consuming and costly operation which in turn materially increases the cost of such motors and for small motors the cost is almost prohibitive since they cannot compete with the less costly, less efficient and noisier shaded pole motors.

According to the present invention the main windings are wound on necked salient poles of comparatively wide extent and having a comparatively large armature embrace. The capacitor windings are placed on comparatively narrow flat sided salient poles lying between the poles on which the main windings are placed and leaving a comparatively wide deep space between adjacent salient poles.

Small capacitor start capacitor run motors are noted for their efficiency and quietness in operation over other small motors such as shaded pole motors which characteristic was originally thought to be due to the distributed windings. However, it has been found that motors made according to the present invention have a surprising low noise level and their efficiency is not materially reduced over that of similar motors having distributed windings.

The capacitor motor of the present invention may be manufactured more economically than capacitor motors having distributed windings and thus can compete favorably cost wise with other small motors in addition to being quieter and more efficient.

The large space between adjacent salient poles permits the main coil to be machine wound in situ about the necked salient poles and about each pole separately before the capacitor windings are in place, thus permitting the use of a comparatively simple winding machine and providing ample space for the winding machine needles to reciprocate back and forth in the deep wide slots between the salient poles. The capacitor winding may then be form wound from a long length of fine wire into the form of a coil or spool which may be slid over the parallel sided salient poles after the main coils are wound.

Thereafter simple insulating wedges may be inserted between adjacent coils to hold the coils in place and small strips of magnetic material placed between adjacent pole tips to spread the flux more evenly and to aid in holding the capacitor coils in position.

The rotor of the motor of the present invention is of the conventional squirrel cage type so that the same number of poles are induced therein as there are poles on the stator.

According to the present invention the insulation problem is simplified since each coil is wound separately and separately insulated. Thus the amount of insulation between the main and capacitor windings is materially reduced. In conventional capacitor motors where the main and capacitor windings overlap there may be a voltage differential between them of from 500 to 600 volts which requires heavy insulation. The problem of insulating between the connections is not present as in conventional motors of this type since the connections do not overlap.

Should one of the capacitor windings prove defective it can easily be removed and replaced with a new one.

The motor of the present invention also results in a considerable saving in material over conventional motors of the same rating thus resulting in further economy in its manufacture.

Due to the pole arrangement of the present invention the transformer action between the main and capacitor windings is reduced to a minimum with the result that a much smaller capacitor may be used thus further reducing the cost of the motor and also the electrical losses when the motor is in operation.

The United States patent to Tesla 416,193, dated December 3, 1889, discloses a motor in which the main windings are wound on salient poles and the auxiliary windings are wound on separate salient poles between the main windings. However, a motor of the Tesla type is very noisy and inefficient because of poor flux distribution. It does not have the advantages of the present invention since no space is provided between the main and auxiliary poles to provide for the machine winding of the main coils and the pole extent about the armature is small. Additionally there is no material difference between the circumferential extent or armature embrace of the main and auxiliary poles.

The motor of the present invention is designed for driving small electric fans and must be quiet and efficient in operation. The Tesla motor would be entirely unsuitable for such purposes and the motor of the present invention is an improvement.

In one application of the motor of the present invention the circumferential extent of the main poles is 33°, that of the capacitor poles 11° and that of the gap between the adjacent pole tips 8°. Thus the embrace of the main poles is about three times that of capacitor poles and the total circumferential extent of all of the poles is between 70 and 75 percent of the total armature embracement.

Figure 2:
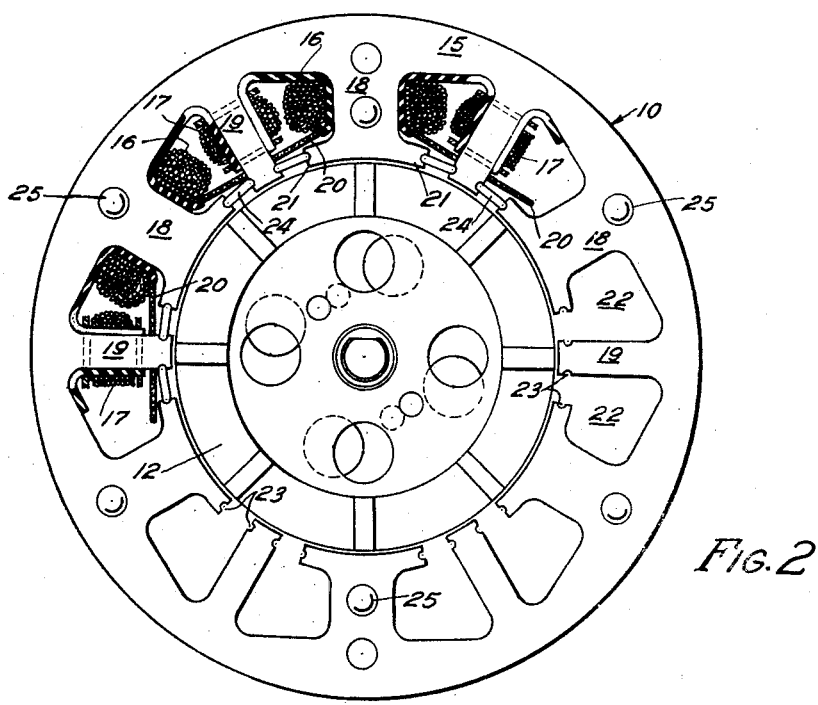
Figure 3:
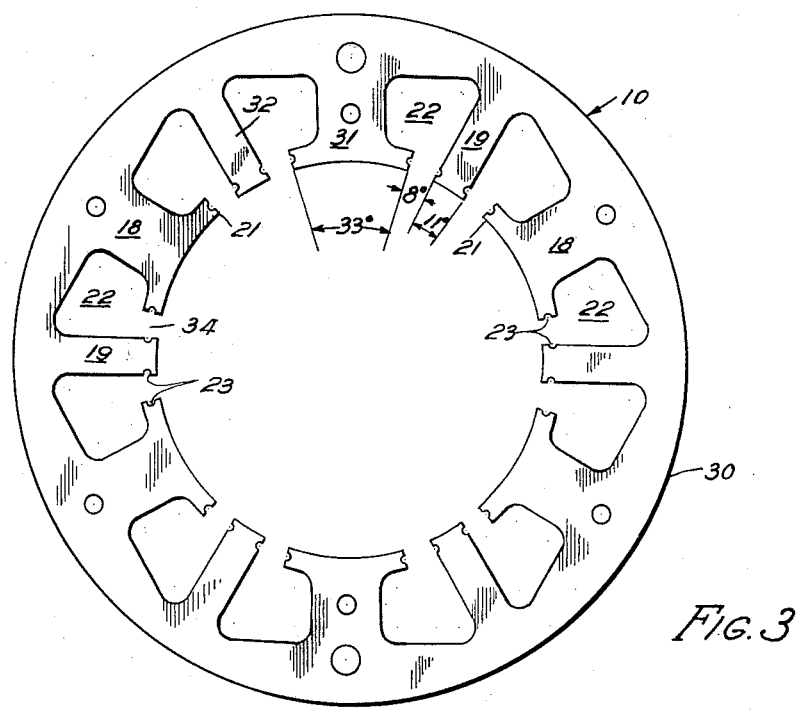
Figure 4:
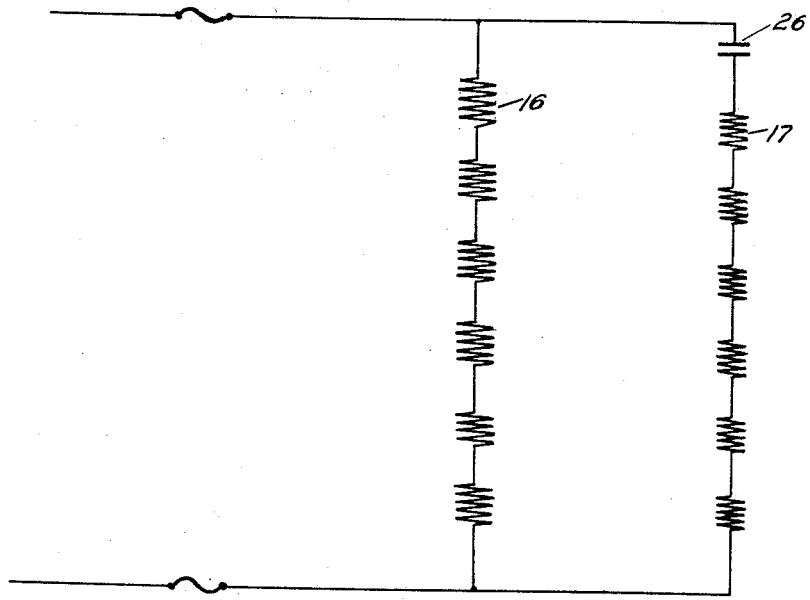

Other objects and advantages of the present invention will become apparent as the description proceeds when taken in connection with the accompanying drawings in which, Fig. 1 is a sectional view of the completed motor of the present invention, Fig. 2 is an end view of the field stack and rotor of the motor of the present invention showing some of the field coils in section, Fig. 3 is a plan view of one of the laminations of the field core of the present invention, and Fig. 4 is the wiring diagram of the motor of the present invention.

Fig. 1 shows the completed motor of the present invention which comprises a stator generally indicated by the reference numeral 10 housed within a frame 11. A conventional squirrel cage rotor 12 is mounted within the casing 11 on bearings 13 and 14 of any suitable construction.

The stator 10 as shown in Fig. 2 comprises a field stack 15 formed of soft iron laminations, main windings 16 and capacitor windings 17. The main windings 16 surround necked salient poles 18 and the capacitor windings 17 surrounds narrower parallel sided salient poles 19. The windings 16 and 17 are held in place by insulating wedges 20 which lie inwardly of the windings and serve to hold the windings in place.

The outer end of poles 18 are widened as shown at 21 so as to extend toward the free ends of poles 19 to form large spaces 22 between adjacent poles 18 and 19. The tips of poles are grooved as shown at 23 for receiving strips or wedges 24 of magnetic material which serve the double function of distributing the flux more evenly and holding the capacitor windings 17 in place. The laminations are held together by any suitable number of rivets 25.

As shown in Fig. 4 the main windings 16 are connected directly across the line with the auxiliary or capacitor windings in parallel circuit therewith and connected in series circuit with a condenser 26.

In operation the condenser 26 displaces the phase of the windings 17 from that of the windings 16 to give the motor starting torque.

The lamination 30 shown in Fig. 3 illustrates the relationship used in making a six pole motor according to the present invention. The necked radial legs 31 form one lamination of the poles 18 and the parallel sided legs 32 form one lamination of the poles 19.

Each of the extended ends of leg 31 forms 33°, each tip of legs 32 forms 11° and each of the gaps 34 form 8° of the total stator embracement. Thus, the total pole embrace is 264° and that of the air gap is 96°, which in the finished motor are closed by magnetic strips or wedges 24.

It is to be noted that the embrace of the main poles is about three times that of the capacitor poles and that the total pole embrace is between 70 and 75 percent of the total embracement.

The foregoing relationship, while not absolutely essential, contributes materially to the quiet operation and efficiency of the motor of the present invention.

The ratio between the main pole embrace and the capacitor pole embrace determines to some extent the starting characteristics of the motor and also determines to some extent the size of the capacitor or condenser which is necessary.

*Method of making*

The laminations 30 shown in Fig. 3 are stamped and a number necessary to form the field stack 15 is riveted together by rivets 25. Before the windings 17 are applied the assembled field stack 15 is placed in a simple winding machine and the coils 16 wound about the poles 18 behind the widened tips 21. Depending upon the type of winding machine used, more than one pole may be wound simultaneously but each pole is separately wound. In any event there is plenty of room formed by the spaces 22 for the winding needles to move in the spaces 22 due to the fact the coils 17 have not yet been assembled. That feature simplifies and speeds up the coil winding operation.

The coils 17 are separately formed by a coil former in the shape of a spool from a long length of fine wire and properly insulated. The finished coils 17 are then slipped over the ends of the poles 19 and the insulating wedges 20 applied inwardly of the coils 16 and 17. Magnetic strips 24 are then assembled into the grooves 23 completing the assembly of stator 10 which may then be assembled with the frame 11 and rotor 12 in an obvious manner.

From the foregoing it can be seen that the motor of the present invention lends itself to ease in assembly and manufacture, thereby reducing the cost while at the same time retaining its good operating characteristics.

While I have shown and described but a single embodiment of my invention it is to be understood that that embodiment is to be taken as illustrative only and not in a limiting sense. I do not wish to be limited to the specific structure shown and described but wish to include all equivalent variations thereof except as limited by the scope of the claims.

I claim:

1. A capacitor start capacitor run electric motor comprising, an annular laminated field stack having a plurality of necked salient poles and the same number of parallel sided poles positioned midway between said necked salient poles and forming a circular embracement for a rotor, said poles being of substantially the same radial extent and the circumferential extent of said necked pole being substantially greater than that of said parallel sided poles, said stack being formed with wide gaps between said necked and parallel sides poles, main windings surrounding said necked poles and filling a portion of said gaps and capacitor winding surrounding said parallel sided poles and filling another portion of said gap, a condenser connected in series circuit with said capacitor windings, said condenser and said capacitor windings being connected in parallel circuit with said main windings and a rotor mounted to rotate within said circular embracement.

2. An electric motor according to claim 1 in which said main windings are machine wound in situ about said necked poles and said capacitor windings are in the form of spools inserted over said parallel sided poles.

3. An electric motor according to claim 1 in which the circumferential extent of said necked poles is approximately three times that of said parallel sided poles.

4. An electric motor according to claim 1 in which the circumferential extent of all of said poles is between 70 and 75 percent of the total embracement.

References Cited in the file of this patent

UNITED STATES PATENTS

| | | |
|---|---|---|
| 416,193 | Tesla | Dec. 3, 1889 |
| 1,045,159 | Lundell | Nov. 26, 1912 |
| 2,012,368 | Zetsche | Aug. 27, 1935 |
| 2,399,931 | Lamborn | May 7, 1946 |
| 2,467,751 | Hoover et al. | Apr. 19, 1949 |
| 2,561,428 | Sutherland | July 24, 1951 |
| 2,761,082 | Chang | Aug. 28, 1956 |

UNITED STATES PATENT OFFICE

CERTIFICATE OF CORRECTION

Patent No. 2,907,904                                                October 6, 1959

Kenneth L. Carpenter

It is hereby certified that error appears in the printed specification of the above numbered patent requiring correction and that the said Letters Patent should read as corrected below.

Column 4, line 30, for ":parallel sides poles" read -- parallel sided poles --.

Signed and sealed this 10th day of May 1960.

(SEAL)
Attest:

KARL H. AXLINE
Attesting Officer

ROBERT C. WATSON
Commissioner of Patents